United States Patent [19]

Hodges

[11] 4,087,157

[45] May 2, 1978

[54] HELICAL SPRING OPTICAL FIBER CONNECTOR AND SPLICE

[75] Inventor: Robert J. Hodges, Cheshunt, England

[73] Assignee: International Standard Electric Corporation, New York, N.Y.

[21] Appl. No.: 730,606

[22] Filed: Oct. 7, 1976

[51] Int. Cl.² .............................................. G02B 5/16
[52] U.S. Cl. .................................................. 350/96.21
[58] Field of Search .......... 350/96 C; 339/205, 256 S; 267/155, 166, 180

[56] References Cited

U.S. PATENT DOCUMENTS

| | | | |
|---|---|---|---|
| 1,987,316 | 1/1935 | Zimmer | 267/155 |
| 2,521,722 | 9/1950 | Hubbell et al. | 339/205 |
| 3,734,594 | 5/1973 | Trambarulo | 350/96 C |
| 3,861,781 | 1/1975 | Hasegawa et al. | 350/96 C |
| 3,883,681 | 5/1975 | Campbell | 350/96 C |
| 3,936,142 | 2/1976 | Kersten | 350/96 C |
| 3,982,815 | 9/1976 | Nakayama | 350/96 C |

FOREIGN PATENT DOCUMENTS 803,640   10/1958   United Kingdom ............. 339/256 S Primary Examiner—Jon W. Henry
Attorney, Agent, or Firm—Thomas L. Peterson

[57] ABSTRACT

Optical fibers that have had the plastic coatings stripped from their ends, or ferrule terminated optical fibers or bundles, are connected in aligned butting relationship by close-wound helical strip springs.

6 Claims, 3 Drawing Figures

HELICAL SPRING OPTICAL FIBER CONNECTOR AND SPLICE

BACKGROUND OF THE INVENTION

This invention relates to optical fiber connectors and splices and, in particular, to connectors and splices in which optical fibers are held with their cores in aligned butting relationship.

In order to achieve the efficient transfer of light from the end of one optical fiber into the end of another butted against the first, it is necessary to bring the fiber cores into exact alignment. This can be effected on a trial and error basis involving monitoring the light transfer efficiency while the end of one fiber is scanned relative to the end of the other. Alternatively, the fiber ends have to be provided with reference surfaces whose position relative to their respective fiber cores is accurately known. Alignment of the cores is then achieved by bringing these reference surfaces into appropriate alignment.

This invention is concerned with this second method of achieving alignment and in particular with the use of cylindrical reference surfaces centered on the fiber cores. The reference surface that is used may be the surface of the fiber cladding or it may be the surface of a ferrule-type termination secured to the fiber in the region of its end.

SUMMARY OF THE INVENTION

According to the principal aspect of the present invention, there is provided a permanent or demountable butt joint between the ends of a pair of optical fibers. The fibers are held butted together in alignment by a close would helix of strip material engaged around and gripping the two fibers or ferrules terminated thereto.

The invention is also applicable to fiber bundle butt joints in which case the bundles are terminated by ferrules and the helix hold the ferrules butted together in alignment with each other, but without ensuring that the individual fibers of the two bundles are aligned with each other on an individual basis.

DESCRIPTION OF THE PREFERRED EMBODIMENTS

Figure 1:
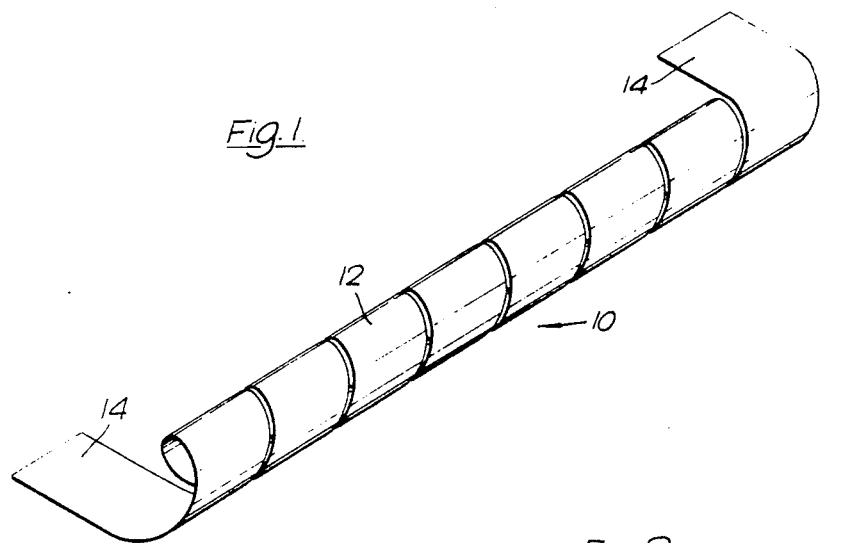
FIG. 1 is a perspective view of one embodiment of the helical spring optical fiber connector of the invention.

Referring to FIG. 1 of the drawing in detail, there is shown a helical spring connector 10 for fitting directly around the cladding layers of single optical fibers. Each fiber may be, for example, made of doped fused silica having an external diameter of 150 $\mu$m. The fibers to be joined may be plastic coated fibers from the ends of which the plastic coating has been stripped in preparation for making the joint. The cladding layers on the stripped ends of the fibers to be butt joined provide cylindrical reference surfaces of equal diameter each of which is coaxial with its associated fiber core.

The connector 10 consists of a single close-wound helix 12 which may be formed from a flat strip of phospher bronze or beryllium copper. The strip may be typically 250 $\mu$m wide and 50 $\mu$m thick. The helix may be wound on a high tensile steel wire whose diameter is approximately 15% undersize with respect to the diameter of the fiber cladding. A typical connector may comprise about 8 turns. In the case of a helix made of beryllium copper, the helix is preferably precipitation hardened by a heat treatment while still on the mandrel so as to reduce hardening distortion.

The two ends of the helix 12 terminate in substantially unbent tab portions 14 by which the helix can be held to unwind it slightly so as to expand the helix and allow the ends of optical fibers to be introduced from opposite ends. Unless the coils of the helix are held together when it is partially unwound, the unwiding causes a slight separation of the coils. Therefore, if the fibers are butted together within the helix before its ends are released, the lateral alignment of the fibers produced by releasing the helix is accompanied by a tendency to urge the two fiber ends into contact.

Figure 2:
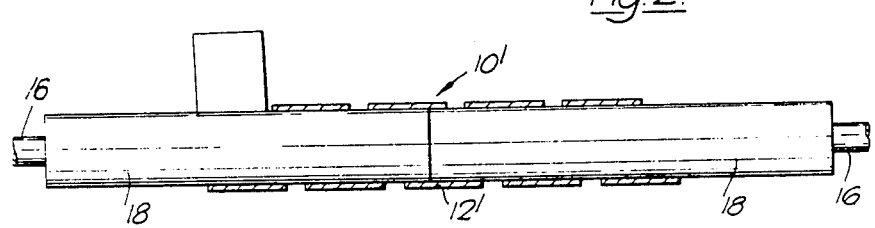
FIG. 2 is a partial longitudinal section of a helical spring connector joining a pair of optical fibers terminated by ferrules.

The same arrangement of helix connector, though on a larger scale, may be used for making an aligned butt joint between single optical fibers 16 terminated by ferrules 18, as seen in FIG. 2. The outer cylindrical surfaces of the ferrules 18 provide reference surfaces that are coaxial with their respective fiber cores. In the case of the connector 10' for ferrule terminated fibers 16 having an external diameter of 1.8 mm, the helix 12' typically has about 5 turns and is made of 180 $\mu$m thick strip 0.5 mm wide. This may be wound on a stainless steel mandrel typically about 10% undersize in diameter with respect to that of the ferrules 18.

The same arrangement of helix though generally on a still larger scale may be used for making an aligned butt joint between ferrule terminated optical fiber bundles, not shown. In the case of fiber bundles, the outer cylindrical surfaces of the ferrules for the bundles provide reference surfaces that are coaxial with the axes of the respective bundles.

In each of the three instances, the joint that is made is a demountable joint, but this may be rendered permanent by, for instance, embedding the assembly in a resin potting compound. A connector incorporating one or more helices may have one end of each helix secured while the other end is arranged to be rotated with insertion and withdrawal of the cooperating half of the connector. In this way, it may be arranged that the, or each, pair of butted fibers or fiber bundles is released before the connector parts are separated, and are firmly gripped again when the two parts are fully mated.

Figure 3:
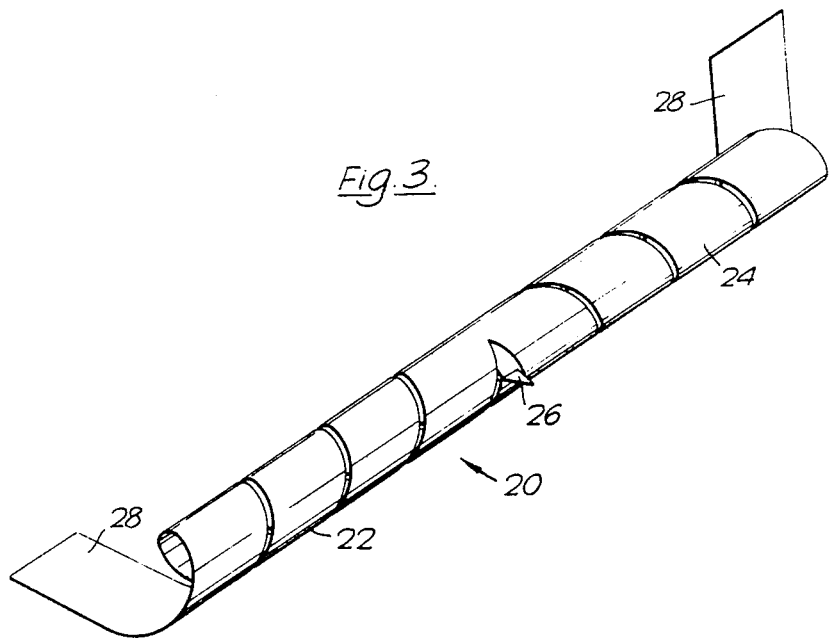
FIG. 3 is a perspective view of a second embodiment of the optical fiber connector of the invention.

A feature of the single helix connector is that when a torque is applied to its ends to release a pair of fibers or fiber bundles that have been secured therein, both members of the pair are released. In some circumstances, it may be desired to be able to release one member without releasing the other. This facility is provided by the double helix arrangement 20 of FIG. 3.

In this arrangement, a left-handed helix part 22 and the right-handed helix part 24 meet in the middle. At their junction, there is provided a tang 26 so that a torque may be applied between this and either one of the ends 28 so as to release just the one half 22 or 24. For this connector to be effective, the fibers or fiber bundles must be butted therein substantially at the junction of the two helix parts.

What is claimed is:

1. A connector for butt joining a pair of optical fibers having means adjacent to their ends to be butt joined providing cylindrical reference surfaces of equal diameter, comprising:
- a helical spring of strip material having an inner diameter less than the diameter of said cylindrical reference surfaces and adapted to receive said fibers in the opposite ends thereof whereby the coils of the spring will resiliently engage around and grip said fibers;
- said helical spring having first and second axial parts;
- said first axial part being a right-handed helix and said second axial part being a left-handed helix; and
- means on said helical spring for expanding said spring to permit said fibers to be inserted therein.

2. A connector as set forth in claim 1 wherein:
said means comprises laterally extending tab portions on the coils at the opposite ends of said helical spring.

3. A connector as set forth in claim 1 wherein:
said helical spring has an outwardly extending tang thereon at the junction of said first and second axial parts thereof.

4. An optical fiber joint comprising:
- a helical spring of strip material;
- a pair of optical fibers having means adjacent to their ends to be joined providing cylindrical reference surfaces of equal diameter;
- said fibers extending into the opposite ends of said helical spring in abutting relationship;
- said helical spring resiliently gripping said cylindrical reference surfaces to align said optical fibers and resiliently urging said fibers into said abutting relationship;
- said helical spring having first and second axial parts;
- said first axial part being a right-handed helix and said second axial part being a left-handed helix; and
- said fibers abutting adjacent to the junction of said first and second axial parts.

5. An optical fiber joint as set forth in claim 4 including:
means on said helical spring for expanding said spring to permit said fibers to be inserted therein and withdrawn therefrom.

6. An optical fiber joint as set forth in claim 5 wherein:
said means comprises laterally extending tab portions on the coils at the opposite ends of said helical spring.

* * * * *